(12) United States Patent
McClary et al.

(10) Patent No.: US 6,683,692 B2
(45) Date of Patent: Jan. 27, 2004

(54) DITHER SYSTEM FOR MOTION SENSORS

(75) Inventors: Charles McClary, Spring Lake Park, MN (US); John R. Morrison, Minneapolis, MN (US); Joseph E. Killpatrick, St. Anthony, MN (US)

(73) Assignee: Honeywell International, Morristown, NJ (US)

( * ) Notice: Subject to any disclaimer, the term of this patent is extended or adjusted under 35 U.S.C. 154(b) by 52 days.

(21) Appl. No.: 09/886,582

(22) Filed: Jun. 21, 2001

(65) Prior Publication Data

US 2002/0196445 A1 Dec. 26, 2002

(51) Int. Cl.$^7$ ................................................ G01C 19/68
(52) U.S. Cl. ..................... 356/475; 73/504.12; 356/472
(58) Field of Search ............................... 356/475, 472; 73/504.12

(56) References Cited

U.S. PATENT DOCUMENTS

| | | |
|---|---|---|
| 3,373,650 A | 3/1968 | Killpatrick |
| 3,390,606 A | 7/1968 | Podgorski |
| 3,467,472 A | 9/1969 | Killpatrick |
| 4,167,336 A | 9/1979 | Ljung |
| 4,255,054 A | 3/1981 | Friedland |
| 4,321,557 A | 3/1982 | McNair |
| 4,344,706 A | 8/1982 | Ljung et al. |
| 4,370,583 A | 1/1983 | Ljung |
| 4,411,527 A | 10/1983 | Gamertsfelder et al. |
| 4,445,779 A | 5/1984 | Johnson |
| 4,533,248 A | 8/1985 | Baumann |
| 4,597,667 A | 7/1986 | Curby et al. |
| 4,610,543 A | 9/1986 | Ferriss |
| 4,653,918 A | 3/1987 | Stjern et al. |
| 4,653,919 A | 3/1987 | Stjern et al. |
| 4,686,683 A | 8/1987 | Martin |
| 4,695,160 A | 9/1987 | Egli |
| 4,710,027 A | 12/1987 | Fersht et al. |
| 4,740,083 A | 4/1988 | Curby et al. |
| 4,740,084 A | 4/1988 | Curby et al. |
| 4,755,057 A | 7/1988 | Curby et al. |
| 4,779,985 A | 10/1988 | Wirt |
| 4,783,169 A | 11/1988 | Matthews et al. |
| 4,801,206 A | 1/1989 | Benoist |
| 5,349,855 A | 9/1994 | Bernstein et al. |
| 5,363,194 A * | 11/1994 | Killpatrick et al. ......... 356/459 |
| 5,960,022 A * | 9/1999 | Halldorsson et al. ....... 356/459 |
| 6,208,414 B1 * | 3/2001 | Killpatrick et al. ......... 356/459 |
| 6,229,615 B1 * | 5/2001 | Karpinski, Jr. .............. 356/475 |

OTHER PUBLICATIONS

Article by Joseph E. Killpatrick, entitled "Laser Gyro Dither Random Noise" Proceedings of S.P.I.E., Meeting on Physics of Optical Ring Gyros, vol. 487 (1984), pp. 85–93.
International Search Report in PCT/US02/19709, dated Oct. 23, 2002.
J. Killpatrick, "The Digital Laser Gyro", Scientific Honeyweller, Honeywell's Corporate, 1996, pp. 80–87.

* cited by examiner

*Primary Examiner*—Constantine Hannaher
(74) *Attorney, Agent, or Firm*—Schiff Hardin & Waite (57) ABSTRACT

A ring laser gyroscope or other motion sensor is dithered at a first rate if a global positioning signal is available and/or when alignment is not being performed, and is dithered at a second rate if a global positioning signal is not available and/or when alignment is being performed. The second rate is greater than the first rate.

37 Claims, 3 Drawing Sheets

DITHER SYSTEM FOR MOTION SENSORS

TECHNICAL FIELD OF THE INVENTION

The present invention relates to the dithering of motion sensors such as ring laser gyroscopes and mechanical gyroscopes.

BACKGROUND OF THE INVENTION

A ring laser gyroscope is a laser apparatus having a ring type resonant cavity which may be more simply referred to as a ring resonator. The ring resonator is commonly constructed of a block of glass or glass ceramic having a plurality of interconnecting passages in the shape of a closed loop path such as, for example, a triangular or rectangular path. Laser beams are directed around the path by suitable mirrors appropriately positioned at the intersections of pairs of the interconnecting passages.

In ring laser gyroscopes, there are commonly two laser beams traveling in opposite directions (clockwise and counterclockwise) relative to each other around the closed loop path formed by the ring cavity. The positioning of the mirrors at the corners of the closed loop path direct the laser beams through the passages of the resonant cavity. A mirror at one of the corners is partially transmissive so that a portion of each of the counter-propagating beams is passed to a readout assembly. Some examples of ring laser gyroscopes are shown and described in U.S. Pat. No. 3,373,650 and U.S. Pat. No. 3,467,472 issued to Killpatrick, and in U.S. Pat. No. 3,390,606 issued to Podgorski.

A source of error in the output of a ring laser gyroscope is "lock-in." At rotation input rates below some critical value called the lock-in threshold or the lock-in rate, the counter-propagating beam frequencies synchronize to a common value resulting in a zero frequency difference between the counter-propagating beams. Because the frequency difference between the beams is used to determine the rotation rate of the ring laser gyroscope, a zero frequency difference at low rotation rates due to lock-in erroneously indicates no rotation.

To maintain a frequency difference between the counter-propagating beams at low rotation rates and thereby avoid lock-in, ring laser gyroscopes have been biased into oscillation about their input axis. Such biasing is shown and described in the aforementioned U.S. Pat. No. 3,373,650. This bias oscillation of a ring laser gyroscope is referred to as dither and is commonly provided by a dither motor which rotates the gyroscope block relative to an inertial platform, as further shown and described in the aforementioned patent. The oscillating rotation bias results in rotation rates that are higher than the lock-in rate for a majority of the operating time.

Typically, a dither motor is comprised of at least one piezoelectric transducer (PZT) attached to a corresponding one of the spokes of a dither spring as shown and described in U.S. Pat. No. 4,370,583 issued to Ljung. The dither spring is generally composed of a central member or hub which is in turn attached to an inertial platform. The spokes of the dither spring are attached at one end to the hub. These spokes extend radially from the hub and are attached at opposite ends to a toroidal rim which engages the gyroscope block.

A sinusoidal drive signal is applied to the aforementioned PZT. The PZT causes flexing of the spoke to which the PZT is attached. This flexing oscillates the rim relative to the hub and thereby rotationally oscillates the gyroscope block relative to the inertial platform. Additionally, as taught in the aforementioned U.S. Pat. No. 3,467,472, noise may be introduced to the sinusoidal signal to further decrease lock-in effects.

Usually, it is desirable to oscillate the gyroscope block, relative to the inertial platform, at the natural resonant frequency of the dither motor. To achieve oscillation at the resonant frequency, a dither sensor is commonly provided and typically comprises at least one PZT dither sensor which is attached to a spoke to sense motion of the gyroscope block relative to inertial platform motion. The output of the dither sensor is used to change the sinusoidal drive signal supplied to the dither motor such that oscillation at the resonant frequency results. Specifically, when the spoke flexes in the aforementioned manner, the PZT dither sensor deforms and produces a responsive output signal, thereby sensing flexing of the spoke. This output signal, or "pick-off" signal, is provided as an input to a feedback circuit. The feedback circuit controls the amplitude and/or frequency of the sinusoidal drive signal supplied to the dither motor such that the dither motor oscillates at or near its natural resonant frequency.

Unfortunately, dithering causes an error angle component in the gyroscope output (i.e., in the frequency difference between the counter-propagating beams), as noted by Killpatrick in Laser Gyro Dither Random Noise Proceedings of S.P.I.E., Meeting on Physics of Optical Ring Gyros, vol. 487 at 85–93 (1984). This error angle component, or noise, in the gyroscope output results in a rotation error in the output of the gyroscope. For a high frequency dithering rate, this error is mathematically represented in the aforementioned reference by the following equation:

$$\Delta\psi(t) = \Omega_L \left( \frac{K t}{2\pi \Omega_D} \right)^{1/2} \quad (1)$$

where $\Delta\psi(t)$ is the error angle component in arc seconds, K is a gyroscope scale factor in arc seconds/cycle, $\Omega_L$ is the lock-in rate in arc seconds/second, $\Omega_D$ is a dither angular rotation rate in arc seconds/second, and t is operating time in seconds.

Dividing through by t in equation (1) to obtain the error angle component rate, also known as the random drift error, produces the following equation:

$$\frac{\Delta\psi(t)}{t} = \Omega_L \left( \frac{K}{2\pi \Omega_D t} \right)^{1/2} \quad (2)$$

By inspection of equation (2), it is evident that, when K, $\Omega_L$, and $\Omega_D$ are held constant, the random drift error $\Delta\psi(t)/t$, or the total error rate in the gyroscope output, decreases with increasing operating time t. Consequently, random drift rate error decreases with increasing gyroscope operating time.

Alternatively, it is also evident in equation (2) that, during a fixed operating time t, an increase in dither angular rotation rate $\Omega_D$, with K and $\Omega_L$ held constant, also decreases random drift error.

Calibration, or "alignment," of an inertial system using a ring laser gyroscope is usually performed by using the ring laser gyroscope to sense the rotation of the earth when the platform of the ring laser gyroscope is stationary except for the earth's rotation. Rotation rate information derived from this sensing "aligns" the inertial system because this information determines North (as well as South, East, and West). The accuracy of this alignment process depends upon the gyroscope's ability to read the input rotational rate to an acceptable accuracy. For example, at a latitude of 45 degrees, the horizontal component of the earth's rotation is approximately 10 degrees/hour in the North and South directions, and 0 degrees/hour in the East and West directions. A gyroscope error of 0.01 degrees/hour then produces an error in alignment of 1 milliradian (0.01/10) radians. The elapsed time necessary to align the gyroscope, known as the alignment time, is determined by the time it takes for the gyroscope error to reduce to a value, for example, of 0.01 degrees/hour.

Because the gyroscope is operating during alignment, t may also represent alignment time in equation (2). It is desired that the alignment time be very short. However, if t representing alignment time in equation (2) is made small, then a large random drift error over that time results.

Moreover, many navigation systems rely on global positioning signals derived from global positioning satellites to increase the accuracy of the position information derived from the inertial sensing provided by a ring laser gyroscope. Thus, the accuracy of a vehicle's position can be increased by these global positioning signals. However, when such global positioning signals are not available, position information provided by a navigation system can contain a higher degree of error.

The present invention is directed, at least in one of its aspects, to an arrangement for reducing errors during periods of alignment and/or during periods when global positioning signals are not present.

Other types of motion sensors such as mechanical gyroscopes are also known. A mechanical gyroscope typically includes a mass that is suspended on a platform whose rotational rate is to be determined. The mass is dithered with a linear oscillatory motion. When a rotational rate is also imposed on the mass, a Coriolis force is generated that is perpendicular to both the linear oscillatory motion and the rotational rate.

This Coriolis force F is given by the following equation:

$$F = 2m\Omega xV \quad (3)$$

where m is the mass, $\Omega$ is the rotational rate to be measured, V is the instantaneous velocity of the linear oscillatory motion described above, and x represents the mathematical cross product. As discussed above, the Coriolis force F causes the mass to move in a direction that is perpendicular to both the rotational rate and the instantaneous velocity of the linear oscillatory motion. The amplitude of this movement is sensed to provide an output proportional to the rotational rate.

As in the case of ring laser gyroscopes, mechanical gyroscopes are also aligned. The present invention is directed, at least in another one of its aspects, to an arrangement for increasing sensitivity of a mechanical gyroscope by increasing dither amplitude so that the mechanical gyroscope can sense smaller rotation rates during periods of alignment.

SUMMARY OF THE INVENTION

In accordance with one aspect of the present invention, a method of dithering a motion sensor comprises the following: dithering the motion sensor with a signal having a first rate amplitude when alignment is not being performed; and, dithering the motion sensor with a signal having a second rate amplitude when alignment is being performed, wherein the second rate amplitude is greater than the first rate amplitude.

In accordance with another aspect of the present invention, a method of dithering a motion sensor comprises the following: dithering the motion sensor with a signal having a first rate amplitude when a global positioning signal is available; and, dithering the motion sensor with a signal having a second rate when the global positioning signal is not available, wherein the second rate amplitude is greater than the first rate amplitude.

In accordance with yet another aspect of the present invention, a method of dithering a motion sensor comprises then following: dithering the motion sensor with a signal having a first rate amplitude if a global positioning signal is available; dithering the motion sensor with a signal having a second rate amplitude when alignment is not being performed; dithering the motion sensor with a signal having a third rate amplitude if the global positioning signal is not available; and, dithering the motion signal with a signal having a fourth rate amplitude when alignment is being performed, wherein the third rate amplitude is greater than the first rate amplitude, and wherein the fourth rate amplitude is greater than the second rate amplitude.

In accordance with still another aspect of the present invention, a dither system for dithering a motion sensor comprises a dither sensor, a dither motor, and a controller. The dither sensor senses dithering of the motion sensor. The dither motor dithers the motion sensor. The controller has first and second inputs and an output. The output is coupled to the dither motor, and the first input is coupled to the dither sensor. The controller drives the dither motor with a signal having a first dither rate amplitude in response to the first input, and the controller drives the dither motor with a signal having a second dither rate amplitude in response to the second input. The second dither rate amplitude is higher than the first dither rate amplitude.

In accordance a further aspect of the present invention, a method of dithering a motion sensor comprises the following: applying an amplitude control signal to a dither system coupled to the motion sensor such that the motion sensor oscillates in a first mode during a selected time, wherein the amplitude control signal has a first amplitude during the first selected time; adjusting the amplitude control signal after the selected time such that the first amplitude is decreased to a second amplitude; and, applying the amplitude control signal having the second amplitude to the dither system coupled to the motion sensor such that the motion sensor oscillates in a second mode.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
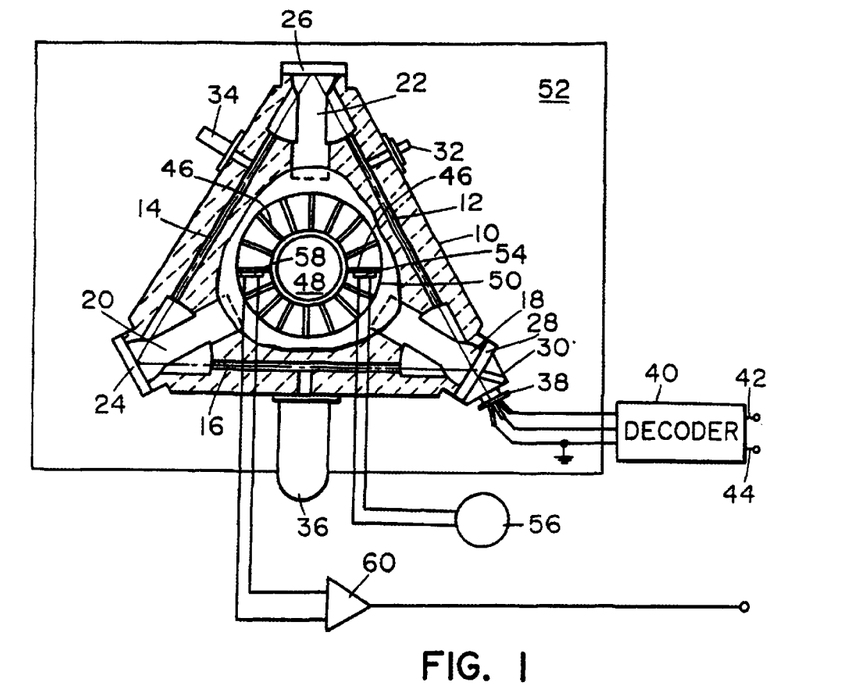
FIG. 1 is a schematic diagram of a prior art ring laser gyroscope.

FIG. 1 is substantially the drawing presented in U.S. Pat. No. 4,344,706 which issued to Ljung et al and which describes a typical ring laser gyroscope. In FIG. 1, a thermally and mechanically stable triangularly-shaped glass-ceramic block 10 contains a plurality of passages 12, 14, and 16 which in turn contain a gas mixture such as helium-neon. A cavity 18 interconnects the passages 12 and 16, a cavity 20 interconnects the passages 14 and 16, and a cavity 22 interconnects the passages 12 and 14 to form a continuous cavity. High reflectivity mirrors 24 and 26 are positioned adjacent to and in communication with the cavities 20 and 22, respectively. A partially transmissive output mirror 28 is positioned adjacent to and in communication with the cavity 18. Furthermore, the mirrors 24, 26, and 28 are all rigidly affixed around their perimeters to the glass ceramic block 10 and direct clockwise and counterclockwise traveling laser beams within the glass ceramic block 10 as will be further described below. A beam combiner 30 is rigidly affixed to the partially transmissive output mirror 28.

A first anode 32 is mounted on the glass ceramic block 10 between the cavities 18 and 22 and is in communication with the passage 12. A second anode 34 is similarly mounted on the glass ceramic block 10 between the cavities 20 and 22 and is in communication with the passage 14. A cathode 36 is mounted on the glass ceramic block 10 between the cavities 18 and 20 and is in communication with the passage 16.

Upon electrically energizing the first and second anodes 32 and 34 and the cathode 36, lasing of a helium-neon mixture occurs to establish clockwise and counterclockwise laser beams within the passages 12, 14, and 16 and the cavities 18, 20, and 22.

The clockwise and counterclockwise laser beams are reflected by the mirrors 24, 26, and 28, and are partially transmitted through the partially transmissive output mirror 28. The portions of the clockwise and counterclockwise laser beams which are transmitted through the partially transmissive output mirror 28 are combined by the beam combiner 30 and are then directed onto a dual photodetector 38. The output of the dual photodetector 38 is decoded by a conventional logic decoder 40 which provides either a pulse on an output line 42 representing clockwise rotation of the glass ceramic block 10, or a pulse on an output line 44 representing counterclockwise rotation of the glass ceramic block 10.

Due to normal irregularities on the surfaces of mirrors 24, 26, and 28, the clockwise and counterclockwise laser beams impinging thereon will be reflected with some backscatter. This backscatter is known to be responsible, in part, for the "lock-in" error discussed above.

In the prior art, lock-in errors have been reduced or minimized by, for example, the implementation of a "dither" system. A typical dither system illustrated in FIG. 1 comprises radial torsion springs or spokes 46 which are mounted between a central support member or hub 48 and a toroidal rim 50. The hub 48 is securely attached to an inertial platform 52, and the toroidal rim 50 is, in turn, in frictional contact with the glass ceramic block 10.

At least one piezoelectric actuator 54 is affixed to at least one of the spokes 46. A sinusoidal voltage provided by an oscillator 56 is then applied to the piezoelectric actuator 54 such that a torsional stress is imparted to the one spoke 46 causing the one spoke 46 to flex thereby causing rotational motion of the toroidal rim 50 and the glass ceramic block 10 relative to the hub 48 and the inertial platform 52 as desired.

Also, at least one piezoelectric transducer 58 is attached to another one of the spokes 46. The mechanical oscillation of the springlike spokes 46 constitutes dither and is detected by the piezoelectric transducer 58. The output of the piezoelectric transducer 58 is coupled to an amplifier 60. The amplifier 60 generates an output signal indicative of angular rotation of the gyroscope, either clockwise or counterclockwise, measured from some fixed reference point when the spring-mass system of the glass ceramic block 10 is at rest. This output signal is commonly referred to as the dither angle signal.

Figure 2:
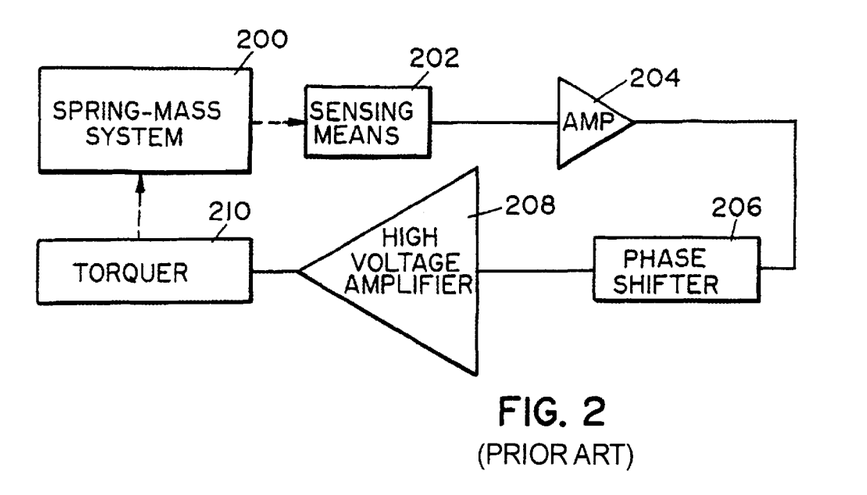
FIG. 2 is a block diagram of a prior art dither system.

A dither system of the prior art, similar in operation to the dither system of FIG. 1, is illustrated in FIG. 2. Therein, a spring-mass system 200 like the combination of the glass ceramic block 10, the inertial platform 52, and the interconnecting resilient coupler provided by the spokes 46 of the ring laser gyroscope shown in FIG. 1, is coupled to a dither sensor 202 which provides a signal indicative of the rotation of the spring-mass system 200. The dither sensor 202 may be provided by a piezoelectric transducer, similar to the piezoelectric transducer 58 of FIG. 1 which is attached to one of the spokes 46. The output signal from the dither sensor 202 is amplified by an amplifier 204 and is coupled to a phase shifter 206. The resulting output of the phase shifter 206 is fed to an amplifier 208 which in turn provides a continuous sinusoidal output voltage connected to a torquer 210. This continuous sinusoidal output voltage is indicative of the output signal from the dither sensor 202. The torquer 210, in response to the continuous sinusoidal output voltage from the amplifier 208, applies a sinusoidal torque to the spring-mass system 200.

The torquer 210 may be, for example, a piezoelectric actuator, similar to the piezoelectric actuator 54 of FIG. 1 that is attached to another one of the spokes 46 to thereby rotate the glass ceramic block 10. Use of a piezoelectric actuator for the torquer 210 typically requires the amplifier 208 to be a high voltage amplifier.

An appropriate adjustment of the phase shifter 206 is required for oscillation at the natural resonant dither frequency of the spring-mass system 200, as is well known in the art. That is, once the spring-mass system 200 is momentarily perturbed, usually by random noise, the phase shifter 206 provides regenerative positive feedback so that the spring-mass system 200 oscillates so as to have a substantially constant clockwise and counterclockwise peak dither angle amplitude determined substantially by the gain of the amplifiers 204 and 208. The mechanical losses of such a system equals the system gain. If the gain is increased by gain adjustment of the amplifier 204 or the amplifier 208, the system will oscillate, still at the natural resonant dither frequency, but with a different peak-to-peak dither angle amplitude. With appropriate design of the spring-mass system 200 (for example, so that it is symmetrical and balanced), the dither angle amplitude will be such that the peak clockwise and the peak counterclockwise dither angle amplitudes will be substantially equal.

As stated earlier, the random drift error in a ring laser gyroscope output is given by equation (2). If all of the other variables in equation (2), including t, are held constant, then it is evident that an increase in the dither rate $\Omega_D$ decreases the random drift error $\Delta\psi(t)/t$.

As shown by the following equation, dither amplitude is related to dither frequency:

$$\theta(t) = \theta \sin(2\pi f_D t) \qquad (4)$$

where $\theta(t)$ is dither angle as a function of time, $\theta$ is dither amplitude in arc seconds, and $f_D$ is dither frequency in cycles/second. Differentiating equation (4) with respect to time t yields the dither angular rotation rate $\Omega_D$ in accordance with the following equation:

$$\frac{d\theta(t)}{dt} = \Omega_D = 2\pi f_D \theta(\cos 2\pi f_D t) \quad (5)$$

Substituting equation (5) into equation (2) produces the following equation:

$$\frac{\Delta\psi(t)}{t} = \Omega_L (\cos 2\pi f_D t)^{-\frac{1}{2}} \left(\frac{K}{4\pi^2 f_D \theta t}\right)^{\frac{1}{2}} \quad (6)$$

Therefore, as shown by equation (6), an increase in dither amplitude θ, with all other variables, including t, held constant, results in a decrease in the random drift error Δψ(t)/t. Accordingly, an increase in dither amplitude, with all other variables held constant, results in the same alignment error in a shorter time t than that necessary to achieve the same error in a longer time t before the dither amplitude was increased. For example, a gyroscope system which aligns in 10 minutes to an acceptable accuracy could be aligned to the same accuracy in 5 minutes, if the dither amplitude θ is doubled.

Figure 3:
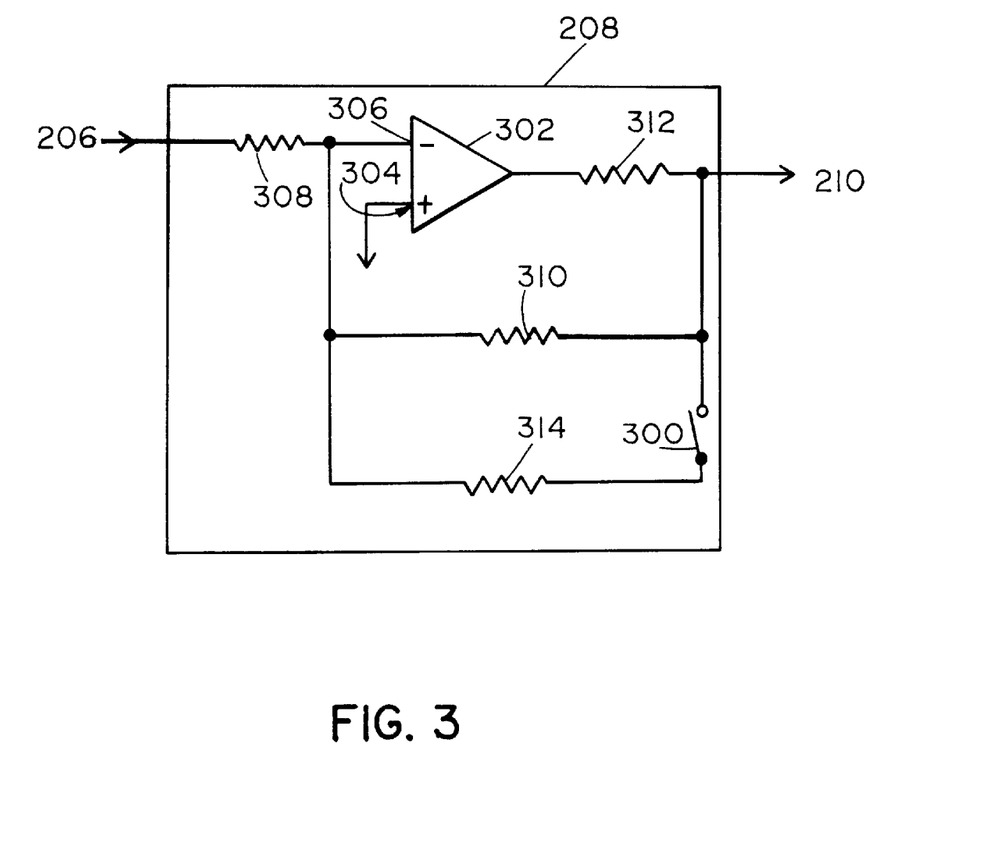
FIG. 3 is a schematic diagram of a portion of a dither system according to one embodiment of the present invention; and, FIG. 4 is a schematic diagram of a mechanical tuning fork gyroscope which can be dithered in accordance with the present invention.

Illustrated in FIG. 3 is an electrical circuit for changing the dither rate at a selected time, and more particularly for increasing the dither amplitude θ during alignment in accordance with equation (6) above. As shown in FIG. 3, the amplifier 208 of FIG. 2 is provided with a gain adjustment switch 300 that controls the gain of an amplifier 302. The amplifier 302 has a positive input 304 coupled to ground and a negative input 306 coupled through an input resistor 308 to the output of the phase shifter 206.

When the gain adjustment switch 300 is "open," only a first feedback resistor 310 is coupled between an output resistor 312 and the negative input 306 of the amplifier 302 in order to control the gain of the amplifier 302. However, when the gain adjustment switch 300 is "closed," both the first feedback resistor 310 and a second feedback resistor 314 are connected in parallel thereby reducing the total resistance coupled across the amplifier 302.

Therefore, opening the gain adjustment switch 300 during gyroscope alignment increases the input voltage to the amplifier 302, thereby increasing the output voltage of the amplifier 302 and, hence, the dither voltage amplitude supplied to the torquer 210. After alignment of the gyroscope, the gain adjustment switch 300 is closed to decrease the dither amplitude in order to prevent deleterious effects on the gyroscope due to extreme acceleration arising from long duration high-amplitude dithering.

Additionally, or alternatively, the gain adjustment switch 300 can be controlled in accordance with the presence or absence of a global positioning signal. Thus, the gain adjustment switch 300 may be opened when a global positioning signal is not available for increased navigational accuracy to thereby increase the input voltage to the amplifier 302, which accordingly increases the output voltage of the amplifier 302 and, hence, the dither voltage amplitude supplied to the torquer 210. On the other hand, the gain adjustment switch 300 may be closed when the global positioning signal is available to thereby decrease the input voltage to the amplifier 302, resulting in a decrease of the output voltage of the amplifier 302 and, hence, the dither voltage amplitude supplied to the torquer 210 to prevent deleterious effects on the gyroscope due to extreme acceleration arising from long duration high-amplitude dithering.

The gain adjustment switch 300 can be controlled, therefore, in accordance with the following code:
  IF ALIGN or NOT GPS
    Then: High Dither Amplitude
    Else: Normal Dither Amplitude Thus, during alignment or when a global positioning signal is currently not available, the dither amplitude is increased to dither the glass ceramic block 10 at a higher rate for greater accuracy. Otherwise, the dither amplitude has its normal value and the glass ceramic block 10 is dithered at its normal rate.

Figure 4:
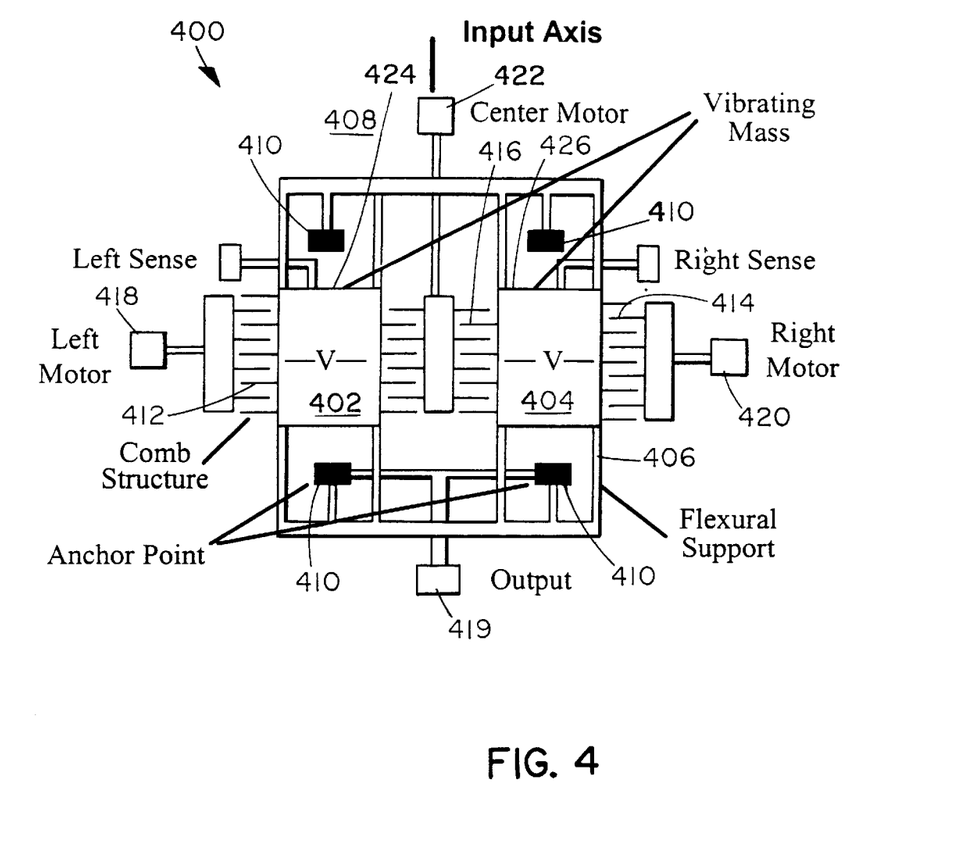

As discussed above, the present invention has applicability to other motion sensors such as a mechanical gyroscope. For example, a mechanical tuning fork gyroscope 400 is illustrated in FIG. 4 and is similar to the mechanical tuning fork gyroscope disclosed in U.S. Pat. No. 5,349,855. The mechanical tuning fork gyroscope 400 includes first and second masses 402 and 404 which are coupled to a flexible frame 406 that is attached to a platform 408 at anchor points 410. A first dither motor 412, a second dither motor 414, and a third dither motor 416 are provided to dither the first and second masses 402 and 404.

Accordingly, the first dither motor 412 is in the form of a comb structure that electrostatically vibrates the first mass 402 in response to a sinusoidal signal applied between a first input terminal 418 and an output terminal 419. The second dither motor 414 is also in the form of a comb structure that electrostatically vibrates the second mass 404 in response to a sinusoidal signal applied between a second input terminal 420 and the output terminal 419. The third dither motor 416 is in the form a double comb structure that electrostatically vibrates both of the first and second masses 402 and 404 in response to a sinusoidal signal applied to between a third terminal 422 and the output terminal 419. Two masses are used in order to maintain a physical balance of the mechanical tuning fork gyroscope 400. Therefore, as is known, the phases of the signals applied between the first, second, and third input terminals 418, 420, and 422 and the output terminal must be controlled in order to achieve this balance.

A first sense capacitor 424 is provided between the first mass 402 and the platform 408. The capacitance of the first sense capacitor 424 changes as the first mass 402 moves in response to dither vibration and the input rotational rate. A second sense capacitor 426 is provided between the second mass 404 and the platform 408. The capacitance of the second sense capacitor 426 changes as the second mass 404 moves in response to dither vibration and the input rotational rate.

The first, second, and third dither motors 412, 414, and 416 dither the first and second masses 402 and 404 in response to oscillators. Accordingly, the first and second masses 402 and 404 are dithered so that they move toward and away from one another at the frequency of the oscillators and so that they each have an instantaneous sinusoidal linear velocity. A rotation rate of the platform 408 causes the resulting Coriolis force F given by equation (3) above and this force is perpendicular to both the rotation input rate and the dither motion. Given the input axis as shown in FIG. 4 and the dithering direction as described above, the direction of the Coriolis force causes the first and second masses to move in a direction that is into or out of the page as the mechanical tuning fork gyroscope 400 is viewed in FIG. 4.

The amplitude of the movement of the first and second masses 402 and 404 is sensed by the first and second sense capacitors 424 and 426, respectively, to provide an output proportional to the mass, the rotation rate, and the dither. An increase in the dither amplitude causes an increase in the instantaneous sinusoidal linear velocity V which, as can be seen from equation (3), causes an increase in the Coriolis force that, in turn, causes greater movement of the first and second masses 402 and 404. This greater movement of the first and second masses 402 and 404 causes the output signals of the first and second sense capacitors 424 and 426 to have a greater amplitude making the mechanical tuning fork gyroscope 400 more sensitive to rotation rate. The dither amplitude of the first and second masses can be selectively controlled by an arrangement similar to that shown in FIGS. 2 and 3.

This increased dither amplitude may be used, for example, during alignment in order to achieve a better calibration of the mechanical tuning fork gyroscope 400. However, this increased dither amplitude can result in damage to the mechanical tuning fork gyroscope 400 and, therefore, should not be maintained for extended periods of time.

Certain modifications of the present invention have been discussed above. Other modifications will occur to those practicing in the art of the present invention. For example, any suitable mechanism other that the amplifier 208 of FIG. 3, such as a computer or logic circuits or elements suitably programmed, may be used to control the dither amplitude of a spring-mass system.

Also, a mechanical gyroscope in the form of the mechanical tuning fork gyroscope 400 has been described above in relation to the present invention. However, other forms of mechanical gyroscopes, such as mechanical gyroscopes having a single mass, can be used in connection with the present invention.

Moreover, the present invention has been described above as being useful during alignment and/or when a GPS signal is unavailable. However, the present invention is useful whenever greater sensitivity is temporarily needed Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

References Not Cited in Application
1. U.S. Pat. No. 4,445,779 issued to Johnson.

What is claimed is:

1. A method of dithering a motion sensor comprising:
dithering the motion sensor with a signal having a first rate amplitude when alignment is not being performed, wherein the dithering of the motion sensor with the signal having the first rate amplitude is implemented by a dither motor;
dithering the motion sensor with a signal having a second rate amplitude when alignment is being performed, wherein the second rate amplitude is greater than the first rate amplitude, and wherein the dithering of the motion sensor with the signal having the second rate amplitude is implemented by the dither motor;
sensing the dithering of the motion sensor by way of a dither sensor; and,
controlling the dithering with a controller having first and second inputs and an output such that the output is coupled to the dither motor and the first input is coupled to the dither sensor, wherein the dithering of the motion sensor with a signal having a first rate amplitude includes dithering the motion sensor in response to the first input, and wherein the dithering of the motion sensor with a signal having a second rate amplitude includes dithering the motion sensor in response to the second input.

2. The method of claim 1 wherein the motion sensor comprises a mechanical gyroscope.

3. The method of claim 2 wherein the dithering of the mechanical gyroscope with the signal having the first rate amplitude comprises dithering the mechanical gyroscope at a first rate, wherein the dithering of the mechanical gyroscope with the signal having the second rate amplitude comprises dithering the mechanical gyroscope at a second rate, and wherein the second rate is greater than the first rate.

4. The method of claim 1 wherein the motion sensor comprises a ring laser gyroscope.

5. The method of claim 4 wherein the dithering of the ring laser gyroscope with the signal having the first rate amplitude comprises dithering the ring laser gyroscope at a first rate, wherein the dithering of the ring laser gyroscope with the signal having the second rate amplitude comprises dithering the ring laser gyroscope at a second rate, and wherein the second rate is greater than the first rate.

6. The method of claim 1 wherein the controlling of the dithering with a controller comprises controlling the gain of the controller by use of the second input.

7. The method of claim 1 wherein the sensing of the dithering of the motion sensor by way of a dither sensor comprises sensing an oscillation of the motion sensor by way of the dither sensor to provide a first output signal indicative thereof, and wherein the controlling of the dithering comprises:

amplifying the first output signal by way of a first amplifier so as to provide a second output signal;

phase shifting the second output signal to provide a third output signal;

amplifying the third output signal by way of a second amplifier so as to provide an amplitude control signal having a first amplitude; and, gain adjusting the second amplifier to provide a second amplitude for the amplitude control signal;

whereby the motion sensor is dithered at the first rate amplitude in response to the amplitude control signal having the first amplitude and the motion sensor is dithered at the second rate amplitude in response to the amplitude control signal having the second amplitude.

8. A method of dithering a motion sensor comprising:
dithering the motion sensor with a signal having a first rate amplitude when a global positioning signal is available, wherein the dithering of the motion sensor with the signal having the first rate amplitude is implemented by a dither motor;
dithering the motion sensor with a signal having a second rate when the global positioning signal is not available, wherein the second rate amplitude is greater than the first rate amplitude, and wherein the dithering of the motion sensor with the signal having the second rate amplitude is implemented by the dither motor;
sensing the dithering of the motion sensor by way of a dither sensor; and,
controlling the dithering with a controller having first and second inputs and an output such that the output is coupled to the dither motor and the first input is coupled to the dither sensor, wherein the dithering of the notion sensor with a signal having a first rate amplitude includes dithering the motion sensor in response to the first input, and wherein the dithering of the motion sensor with a signal having a second rate amplitude includes dithering the motion sensor in response to the second input.

9. The method of claim 8 wherein the motion sensor comprises a ring laser gyroscope.

10. The method of claim 9 wherein the dithering of the ring laser gyroscope with a signal having the first rate amplitude comprises dithering the ring laser gyroscope at a first rate, wherein the dithering of the ring laser gyroscope with the signal having the second rate amplitude comprises dithering the ring laser gyroscope at a second rate, and wherein the second rate is greater than the first rate.

11. The method of claim 8 wherein the controlling of the dithering with a controller comprises controlling the gain of the controller by use of the second input.

12. The method of claim 8 wherein the sensing of the dithering of the motion sensor by way of a dither sensor comprises sensing an oscillation of the motion sensor by way of the dither sensor to provide a first output signal indicative thereof, and wherein the controlling of the dithering comprises:

amplifying the first output signal by way of a first amplifier so as to provide a second output signal;

phase shifting the second output signal to provide a third output signal;

amplifying the third output signal by way of a second amplifier so as to provide an amplitude control signal having a first amplitude; and, gain adjusting the second amplifier to provide a second amplitude for the amplitude control signal;

whereby the motion sensor is dithered at the first rate amplitude in response to the amplitude control signal having the first amplitude and the motion sensor is dithered at the second rate amplitude in response to the amplitude control signal having the second amplitude.

13. A method of dithering a motion sensor comprising:

dithering the motion sensor with a signal having a first rate amplitude if a global positioning signal is available, wherein the dithering of the motion sensor with the signal having the first rate amplitude is implemented by a dither motor;

dithering the motion sensor with a signal having a second rate amplitude when alignment is not being performed, wherein the dithering of the motion sensor with the signal having the second rate amplitude is implemented by the dither motor;

dithering the motion sensor with a signal having a third rate amplitude if the global positioning signal is not available, wherein the dithering of the motion sensor with the signal having the third rate amplitude is implemented by the dither motor;

dithering the motion signal with a signal having a fourth rate amplitude when alignment is being performed, wherein the third rate amplitude is greater than the first rate amplitude, wherein the fourth rate amplitude is greater than the second rate amplitude, and wherein the dithering of the motion sensor with the signal having the fourth rate amplitude is implemented by the dither motor;

sensing the dithering of the motion sensor by way of a dither sensor; and, controlling the dithering with a controller having first and second inputs and an output such that the output is coupled to the dither motor and the first input is coupled to the dither sensor, wherein the dithering of the motion sensor with a signal having a first rate amplitude includes dithering the motion sensor in response to the first input, wherein the dithering of the motion sensor with a signal having a second rate amplitude includes dithering the motion sensor in response to the first input, wherein the dithering of the motion sensor with a signal having a third rate amplitude includes dithering the motion sensor in response to the second input, and wherein the dithering of the motion sensor with a signal having a fourth rate amplitude includes dithering the motion sensor in response to the second input.

14. The method of claim 13 wherein the first and second rate amplitudes are substantially equal, and wherein the third and fourth rate amplitudes are substantially equal.

15. The method of claim 13 wherein the motion sensor comprises a ring laser gyroscope.

16. The method of claim 15 wherein the first and second rate amplitudes are substantially equal, and wherein the third and fourth rate amplitudes are substantially equal.

17. The method of claim 15 wherein the dithering of the ring laser gyroscope with the signal having the first rate amplitude comprises dithering the ring laser gyroscope at a first rate, wherein the dithering of the ring laser gyroscope with the signal having the second rate amplitude comprises dithering the ring laser gyroscope at a second rate, wherein the dithering of the ring laser gyroscope with the signal having the third rate amplitude comprises dithering the ring laser gyroscope at a third rate, and wherein the dithering of the ring laser gyroscope with the signal having the fourth rate amplitude comprises dithering the ring laser gyroscope at a fourth rate.

18. The method of claim 17 wherein the third rate is greater than the first amplitude, and wherein the fourth rate is greater than the second rate.

19. The method of claim 17 wherein the first and second rates are substantially equal, and wherein the third and fourth rates are substantially equal.

20. The method of claim 13 wherein the controlling of the dithering with a controller comprises controlling the gain of the controller by use of the second input.

21. The method of claim 13 wherein the sensing of the dithering of the motion sensor by way of a dither sensor comprises sensing an oscillation of the motion sensor by way of the dither sensor to provide a first output signal indicative thereof, and wherein the controlling of the dithering comprises:

amplifying the first output signal by way of a first amplifier so as to provide a second output signal;

phase shifting the second output signal to provide a third output signal;

amplifying the third output signal by way of a second amplifier so as to provide an amplitude control signal having a first amplitude; and, gain adjusting the second amplifier to provide a second amplitude for the amplitude control signal;

whereby the motion sensor is dithered at the first rate amplitude in response to the amplitude control signal having the first amplitude, whereby the motion sensor is dithered at the second rate amplitude in response to the amplitude control signal having the first amplitude, whereby the motion sensor is dithered at the third rate amplitude in response to the amplitude control signal having the second amplitude, and whereby the motion sensor is dithered at the fourth rate amplitude in response to the amplitude control signal having the second amplitude.

22. A dither system for dithering a motion sensor comprising:

a dither sensor that senses dithering of the motion sensor;

a dither motor that dithers the motion sensor; and, a controller having first and second inputs and an output, wherein the output is coupled to the dither motor, wherein the first input is coupled to the dither sensor, wherein the controller drives the dither motor with a signal having a first dither rate amplitude in response to the first input when the global positioning signal is available, wherein the controller drives the dither motor with a signal having a second dither rate amplitude in response to the second input when the global positioning signal is not available, and wherein the second dither rate amplitude is higher than the first dither rate amplitude.

23. The dither system of claim 22 wherein the second input controls a gain of the controller.

24. The dither system of claim 22 wherein the dither sensor senses an oscillation of the motion sensor and provides a first output signal indicative thereof, and wherein the controller comprises:

an amplifier that is electrically coupled to the dither sensor to amplify the first output signal so as to provide a second output signal;

a phase shifter that is electrically coupled to the amplifier and that receives the second output signal to provide a third output signal; and, a gain adjuster that is electrically coupled to the phase shifter and that receives the third output signal to provide an amplitude control signal having a first amplitude, wherein the gain adjuster may be adjusted to provide a second amplitude for the amplitude control signal;

wherein the dither motor is coupled to the gain adjuster and receives the amplitude control signal to apply a sinusoidal torque to the motion sensor indicative of the amplitude control signal.

25. The dither system of claim 24 wherein the amplifier is a first amplifier, and wherein the gain adjuster comprises:

a second amplifier having a positive input coupled to an electrical ground, a negative input, and an output;

an output resistor having first and second ends, wherein the first end is electrically coupled to the output of the second amplifier to provide the amplitude control signal;

an input resistor electrically coupled between the negative input and the phase shifter so as to receive the third output signal;

a first feedback resistor having first and second ends, wherein the first end of the first feedback resistor is electrically coupled to the negative input and the second end of the first feedback resistor is electrically coupled to the second end of the output resistor; and, a second feedback resistor having first and second ends, wherein the first end of the second feedback resistor is electrically coupled to the first end of the first feedback resistor and the second end of the second feedback resistor is electrically coupled to the second end of the first feedback resistor via the second input of the controller.

26. The dither system of claim 25 wherein the second input of the controller comprises a switch.

27. A dither system for dithering a motion sensor comprising:

a dither sensor that senses dithering of the motion sensor;

a dither motor that dithers the motion sensor; and, a controller having first and second inputs and an output, wherein the output is coupled to the dither motor, wherein the first input is coupled to the dither sensor, wherein the controller drives the dither motor with a signal having a first dither rate amplitude in response to the first input when alignment is not being performed, wherein the controller drives the dither motor with a signal having a second dither rate amplitude in response to the second input when alignment is being performed, and wherein the second dither rate amplitude is higher than the first dither rate amplitude.

28. The dither system of claim 27 wherein the second input controls a gain of the controller.

29. The dither system of claim 27 wherein the dither sensor senses an oscillation of the motion sensor and provides a first output signal indicative thereof, and wherein the controller comprises:

an amplifier that is electrically coupled to the dither sensor to amplify the first output signal so as to provide a second output signal;

a phase shifter that is electrically coupled to the amplifier and that receives the second output signal to provide a third output signal; and, a gain adjuster that is electrically coupled to the phase shifter and that receives the third output signal to provide an amplitude control signal having a first amplitude, wherein the gain adjuster may be adjusted to provide a second amplitude for the amplitude control signal;

wherein the dither motor is coupled to the gain adjuster and receives the amplitude control signal to apply a sinusoidal torque to the motion sensor indicative of the amplitude control signal.

30. The dither system of claim 29 wherein the amplifier is a first amplifier, and wherein the gain adjuster comprises:

a second amplifier having a positive input coupled to an electrical ground, a negative input, and an output;

an output resistor having first and second ends, wherein the first end is electrically coupled to the output of the second amplifier to provide the amplitude control signal;

an input resistor electrically coupled between the negative input and the phase shifter so as to receive the third output signal;

a first feedback resistor having first and second ends, wherein the first end of the first feedback resistor is electrically coupled to the negative input and the second end of the first feedback resistor is electrically coupled to the second end of the output resistor; and, a second feedback resistor having first and second ends, wherein the first end of the second feedback resistor is electrically coupled to the first end of the first feedback resistor and the second end of the second feedback resistor is electrically coupled to the second end of the first feedback resistor via the second input of the controller.

31. The dither system of claim 30 wherein the second input of the controller comprises a switch.

32. A dither system for dithering a motion sensor comprising:

a dither sensor that senses dithering of the motion sensor;

a dither motor that dithers the motion sensor; and, a controller having first and second inputs and an output, wherein the output is coupled to the dither motor, wherein the first input is coupled to the dither sensor, wherein the controller drives the dither motor with a signal having a first dither rate amplitude in response to the first input when alignment is not being performed, wherein the controller drives the dither motor with a signal having second dither rate amplitude in response to the first input when a global positioning signal is available, wherein the controller drives the dither motor with a signal having a third dither rate amplitude in response to the second input when alignment is being performed, wherein the controller drives the dither motor with a signal having a fourth dither rate amplitude in response to the second input when the global positioning signal is not available, wherein the third dither rate amplitude is higher than the first dither rate amplitude, and wherein the fourth dither rate amplitude is higher than the second dither rate amplitude.

33. The dither system of claim 32 wherein the first and second dither rate amplitudes are equal, and wherein the third and fourth dither rate amplitudes are equal.

34. The dither system of claim 32 wherein the second input controls a gain of the controller.

35. The dither system of claim 32 wherein the dither sensor senses an oscillation of the motion sensor and provides a first output signal indicative thereof, and wherein the controller comprises:

an amplifier that is electrically coupled to the dither sensor to amplify the first output signal so as to provide a second output signal;

a phase shifter that is electrically coupled to the amplifier and that receives the second output signal to provide a third output signal; and, a gain adjuster that is electrically coupled to the phase shifter and that receives the third output signal to provide an amplitude control signal having a first amplitude, wherein the gain adjuster may be adjusted to provide a second amplitude for the amplitude control signal;

wherein the dither motor is coupled to the gain adjuster and receives the amplitude control signal to apply a sinusoidal torque to the motion sensor indicative of the amplitude control signal.

36. The dither system of claim 35 wherein the amplifier is a first amplifier, and wherein the gain adjuster comprises a second amplifier having a positive input coupled to an electrical ground, a negative input, and an output;

an output resistor having first and second ends, wherein the first end is electrically coupled to the output of the second amplifier to provide the amplitude control signal;

an input resistor electrically coupled between the negative input and the phase shifter so as to receive the third output signal;

a first feedback resistor having first and second ends, wherein the first end of the first feedback resistor is electrically coupled to the negative input and the second end of the first feedback resistor is electrically coupled to the second end of the output resistor; and, a second feedback resistor having first and second ends, wherein the first end of the second feedback resistor is electrically coupled to the first end of the first feedback resistor and the second end of the second feedback resistor is electrically coupled to the second end of the first feedback resistor via the second input of the controller.

37. The dither system of claim 36 wherein the second input of the controller comprises a switch.

* * * * *

UNITED STATES PATENT AND TRADEMARK OFFICE
CERTIFICATE OF CORRECTION

PATENT NO. : 6,683,692 B2
DATED : January 27, 2004
INVENTOR(S) : Charles McClary et al.

It is certified that error appears in the above-identified patent and that said Letters Patent is hereby corrected as shown below:

Column 10,
Line 61, please change "notion" to -- motion --.

Signed and Sealed this

Seventeenth Day of August, 2004

JON W. DUDAS
*Acting Director of the United States Patent and Trademark Office*